United States Patent
Kline et al.

(10) Patent No.: US 9,205,706 B2
(45) Date of Patent: Dec. 8, 2015

(54) TIRE WITH NOISE-REDUCING TREAD PATTERN

(75) Inventors: Trevor M. Kline, Plymouth, MI (US);
Bradley J. Harris, New London, OH (US); Adam Karl Nesbitt, Akron, OH (US); Justin E. Hayes, Nashville, TN (US); Jon I. Stuckey, Louisville, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 757 days.

(21) Appl. No.: 13/574,984

(22) PCT Filed: Jan. 27, 2010

(86) PCT No.: PCT/US2010/022217
§ 371 (c)(1),
(2), (4) Date: Sep. 26, 2012

(87) PCT Pub. No.: WO2011/093855
PCT Pub. Date: Aug. 4, 2011

(65) Prior Publication Data
US 2013/0008575 A1  Jan. 10, 2013

(51) Int. Cl.
*B60C 11/03* (2006.01)
*B60C 11/11* (2006.01)

(52) U.S. Cl.
CPC ......... *B60C 11/0311* (2013.04); *B60C 11/0318* (2013.04); *B60C 11/11* (2013.01); *B60C 2011/0313* (2013.04)

(58) Field of Classification Search
CPC   B60C 11/03; B60C 11/0302; B60C 11/0306; B60C 11/0311; B60C 2011/0313; B60C 11/0318; B60C 2011/0325; B60C 11/033; B60C 11/0332; B60C 11/11; B60C 2200/06; B60C 2200/08; B60C 2200/14; B29D 30/00; B29D 30/36
USPC ................... 152/209.1, 209.2, 209.3, 209.12, 152/209.13, 209.28, 902
See application file for complete search history.

(56) References Cited

U.S. PATENT DOCUMENTS

| | | | |
|---|---|---|---|
| 5,337,816 A * | 8/1994 | Bonko et al. | 152/209.2 |
| 5,371,685 A * | 12/1994 | Bandel et al. | 703/8 |
| 5,690,760 A * | 11/1997 | Brown, Jr. | 152/209.2 |
| 5,843,248 A | 12/1998 | Baus et al. | |
| 6,363,984 B1 * | 4/2002 | Morgan | 152/209.2 |
| 6,401,774 B1 | 6/2002 | Rooney | |
| 6,651,712 B1 | 11/2003 | Sundkvist et al. | |
| 2005/0167020 A1 | 8/2005 | Rooney | |

OTHER PUBLICATIONS

Kim, Chun Hee, Oct. 7, 2010 International Search Report with Written Opinion from PCT/US2010/022217 (8 pp.).

* cited by examiner

*Primary Examiner* — Eric Hug

(57) ABSTRACT

A tire includes a tire carcass and a tread extending circumferentially about the tire carcass. The tread includes a plurality of tread elements disposed in a tread pattern The plurality of tread elements have one of two different pitch lengths and are disposed in a noise-reducing pitch sequence.

20 Claims, 4 Drawing Sheets

TIRE WITH NOISE-REDUCING TREAD PATTERN

BACKGROUND

The subject matter of the present disclosure broadly relates to the art of tires and, more specifically, to a tire including a tread having a pattern of tread elements disposed in a noise-reducing pitch sequence.

The subject matter of the present disclosure may find particular application and use in association with pneumatic tires used on agricultural equipment (e.g., tractors, combines and harvesters) or otherwise in association with agricultural-related applications, and is illustrated and described herein with specific reference to such agricultural applications. It is to be understood, however, that the subject matter of the present disclosure is broadly applicable to non-pneumatic tires (e.g., solid rubber tires) and is also suitable for inclusion on tires used in association with one or more of a wide variety of other applications (e.g., ATV, construction and forestry applications). As such, the specific reference herein to pneumatic tires for use in agricultural applications is merely exemplary and not intended to be limiting.

Farm equipment, such as tractors, combines and harvesters, for example, are traveling increasing distances over road surfaces during travel between agricultural sites. In an effort to decrease the percentage of time spent in transit, farm equipment is becoming increasingly capable of high-speed travel along roadways (e.g., travel at speeds exceeding 40 MPH). Due to these and/or other circumstances, noise and vibration levels generated by conventional tires on such agricultural and/or other off-road vehicles during travel along roadways and at these higher speeds are becoming increasingly problematic.

Traditionally, agricultural and other tires intended primarily for off-road use have been designed with an emphasis on performance during intended use. For example, agricultural tires may be designed with a focus on draw-bar traction properties, tread-to-void ratios for cleaning and/or soil penetration characteristics, as well as the geometric configurations that promote tire life and durability.

For example, one tread characteristic that is commonly associated with traction and wheel slippage properties relates to the rigidity of the tread elements that form the tread of the tire. More specifically, the rigidity of the tread elements will normally have a relation to the geometric configuration (i.e., the size and shape) of the tread elements. As such, variations in size and/or shape of adjacent tread elements can result in corresponding variations in rigidity that could undesirably affect traction and wheel slippage performance. As a result, many agricultural and other off-road tire designs utilize a mono-pitch tread pattern in which each tread element is identical to the next tread element around the circumference of the tread pattern.

Of course, the use of a tread pattern for a tire that includes a predetermined pitch sequence for aiding in the reduction of noise and/or vibration generated by the tire tread during use is, in general, well known. This concept is commonly practiced in association with passenger tires (i.e., tires for passenger vehicles) for which characteristics such as ride comfort and noise and vibration reduction are significant attributes. It will be recognized, however, that tread patterns and tread element designs used in association with passenger tires are generally targeted toward significantly different performance characteristics than may be prioritized for agricultural or other off-road tires.

Accordingly, it is believed desirable to develop a tire that includes a tire tread capable of aiding in the reduction of the generation of noise and/or vibration while providing the desired performance characteristics commonly associated with tires used in agricultural and other off-road applications.

BRIEF DESCRIPTION

One example of a tire in accordance with the subject matter of the present disclosure can include an axis of rotation and a tread. The tread extends circumferentially about the axis and includes a plurality of tread elements disposed in a tread pattern. The plurality of tread elements are arranged in one of two different pitch lengths with the two different pitch lengths having a pitch ratio within a range of from approximately 1.15 to approximately 1.40. The tread pattern includes 21 pitches having 12 occurrences of a first pitch length and 9 occurrences of a second pitch length.

A tire according to the foregoing paragraph can also include a tread pattern that includes at least one circumferentially-extending row of tread elements consisting of 21 pitches having 12 occurrences of the first pitch length (1) and 9 occurrences of the second pitch length (2) arranged according to a pitch sequence of 111211211122211112222.

DETAILED DESCRIPTION

Figure 1:
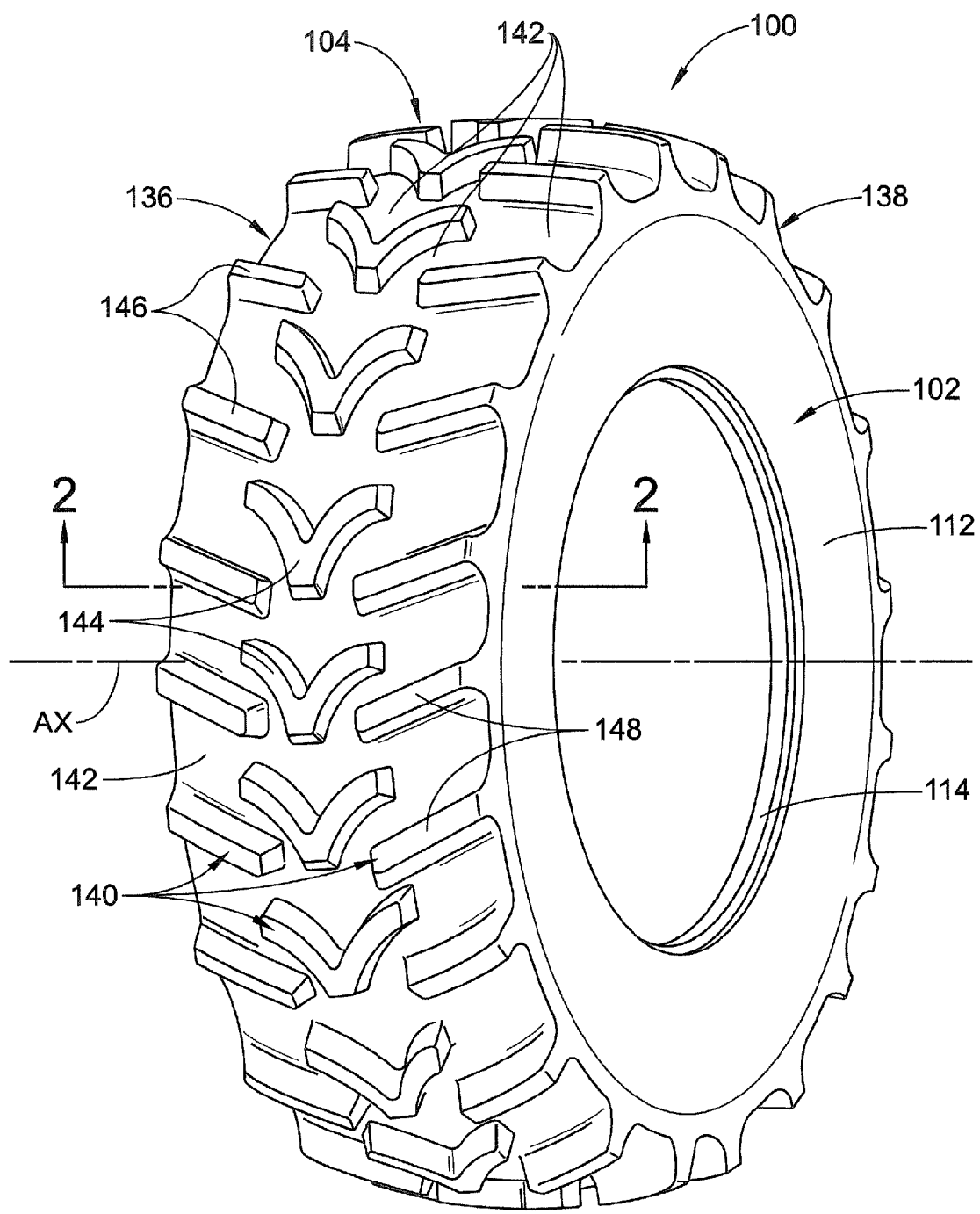
FIG. 1 is a perspective view of one example of a tire in accordance with the subject matter of the present disclosure that includes a tread having a noise-reducing pitch sequence.
Figure 2:
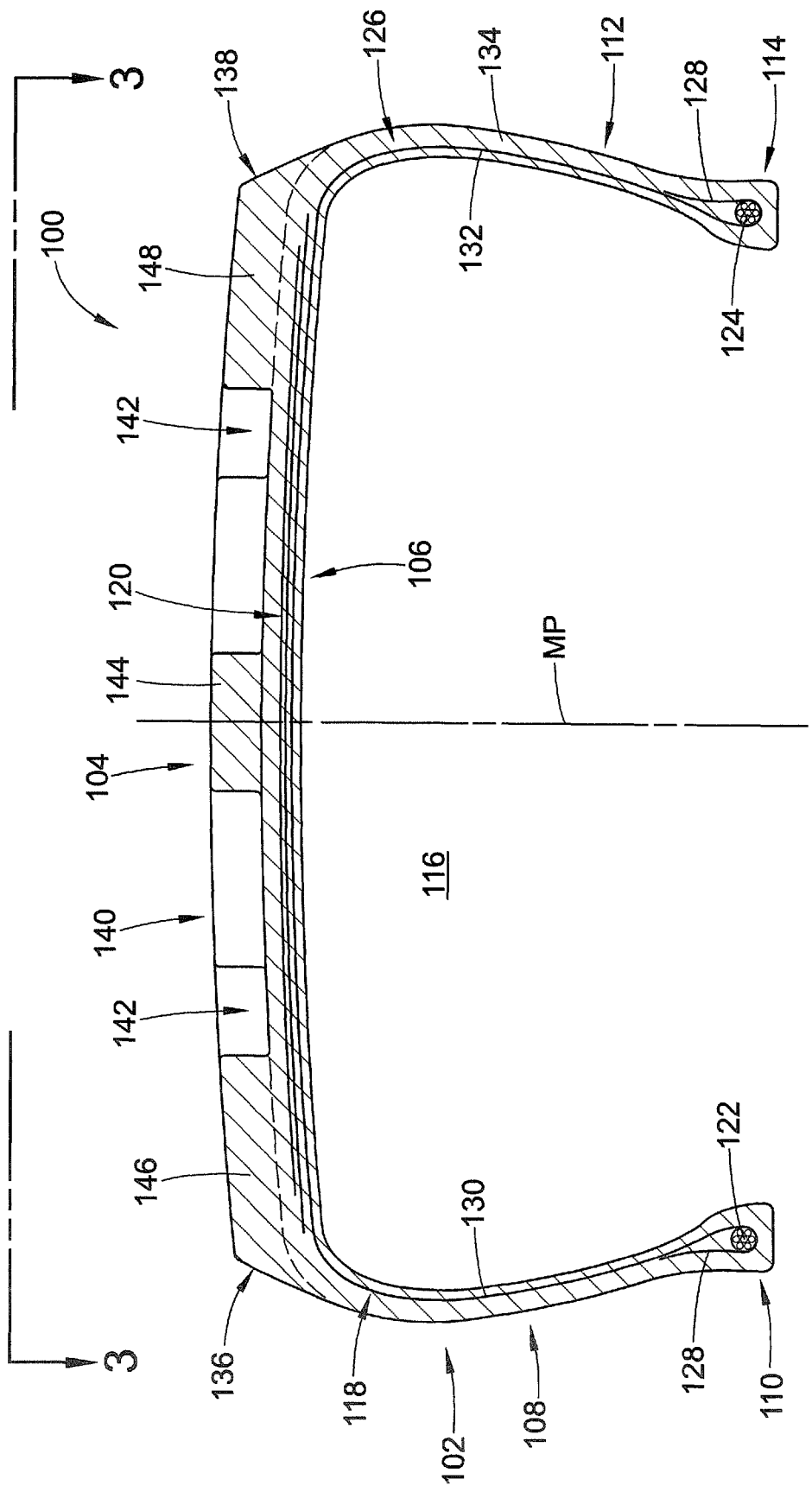
FIG. 2 is a cross-sectional side view of a portion of the exemplary tire in FIG. 1 taken from along line 2-2 thereof.
Figure 3:
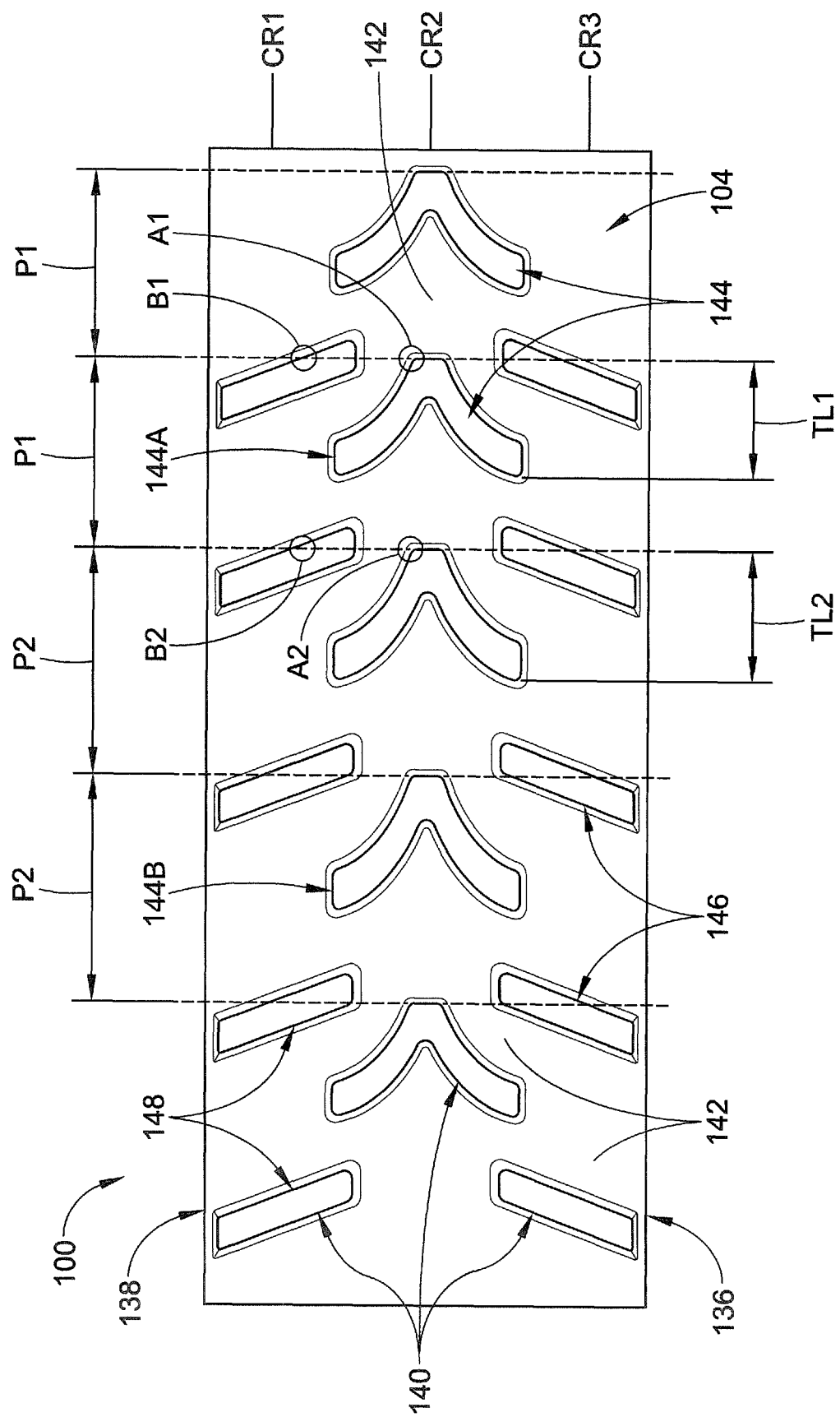
FIG. 3 is an enlarged view of a portion of the tread of the exemplary tire shown in FIGS. 1 and 2 taken from along line 3-3 in FIG. 2 illustrating features of one example of a noise-reducing tread pattern in accordance with the subject matter of the present disclosure.

Turning now to the drawings, wherein the showings are for the purpose of illustrating examples of the subject matter of the present disclosure and which are not intended to be limiting, FIGS. 1-3 illustrate a pneumatic tire 100 including an axis AX about which the pneumatic tire rotates during use in operation. Pneumatic tire 100 includes a tire carcass 102 that extends circumferentially about axis AX and has a generally open toroidal shape. Pneumatic tire 100 also includes a tread 104 that is disposed along the outer circumference of the tire carcass.

A pneumatic tire in accordance with the subject matter of the present disclosure can be of any suitable type, kind, configuration and/or construction. As identified in FIG. 2, tire carcass 102 includes a crown 106 that extends circumferentially about axis AX. A first side wall 108 extends radially-inwardly from crown 106 to a first bead portion 110 and a second side wall 112, which is disposed in axially-spaced relation to first side wall 108, extends radially-inwardly from crown 106 to a second bead portion 114. Crown 106 together with first and second side walls 108 and 112 at least partially define a tire chamber 116 suitable for containing a quantity of pressurized fluid (e.g., pressurized air) in a conventional manner, such as, for example, by mounting first and second bead portions 110 and 114 in a substantially fluid-tight manner on a conventional wheel or rim assembly (not shown).

It will be appreciated that the tire carcass can be of any suitable construction (e.g., a bias-ply construction or a radial-ply construction) and can include any suitable arrangement of components and/or elements formed from any suitable material or combination of materials, such as may be known in the art. In the arrangement illustrated in FIG. 2, for example, tire carcass 102 is shown as including a body 118 and a belt package 120 that extends circumferentially about the body along crown 106. Body 118 is shown as including a first bead core 122 and a second bead core 124 that is axially spaced from the first bead core. Bead cores 122 and 124 can be of any suitable construction, such as, for example, a conventional arrangement that includes a plurality of turns or windings of a length of wire formed into an endless annular ring.

Body 118 of tire carcass 102 is also shown as including one or more body plies 126 that extend between bead cores 122 and 124. The one or more body plies can include turn-up portions 128 that extend around and encapsulate first and second bead cores 122 and 124. It will be appreciated that the one or more body plies can be of any suitable construction and included any suitable configuration of layers of materials and/or combinations of materials. For example, one or more of the body plies can include reinforcing cords 130 and/or one or more of the body plies can include layers of unreinforced material, such as an inner cover layer 132 and an outer cover layer 134, for example.

As mentioned above, a tire in accordance with the subject matter of the present disclosure can be of any suitable type and/or kind and, as such, can include a tread of any suitable size, shape, configuration and/or arrangement. For example, a tire in accordance with the subject matter of the present disclosure can include a tread having an agricultural tread pattern and/or configuration, such as, for example, a tread pattern approximating one of an R1 configuration, an R1W configuration, an R2 configuration, an R3 configuration or an R4 configuration. It will be appreciated, however, that any other suitable off-road tread pattern, design and/or configuration could alternately be used.

With further reference to FIGS. 1-3, tread 104 of pneumatic tire 100 extends circumferentially about tire carcass 102 and extends axially between opposing first and second shoulders 136 and 138, which shoulders generally transition tread 104 into first and second side walls 108 and 112, respectively. Tread 104 includes a plurality of tread elements or lugs, which are collectively identified by item number 140, that are spaced apart from one another and, thus, separated by tread void areas 142. It will be appreciated that tread void areas 142 can include open areas of any suitable size and/or shape and in any suitable arrangement and/or configuration. For example, tread void areas 142 could include circumferentially-extending open areas or any one or more portions thereof, which circumferentially-extending open areas are sometimes referred to in the art as grooves (not shown). As another example, tread void areas 142 could include axially-extending open areas or any one or more portions thereof, which axially-extending open areas are sometimes referred to in the art as slots.

Additionally, it will be appreciated that any one or more of an almost limitless variety of shapes could be used for or otherwise included in plurality of tread elements 140 and/or tread void areas 142, and that the shapes shown and described herein are not intended to be limiting. As identified in greater detail in the exemplary configuration in FIG. 3, plurality of tread elements 140 includes approximately V-shaped tread elements 144 that are shown as being approximately centered along a midplane MP of tire carcass 102. Plurality of tread elements 140 also includes approximately straight elements 146 and 148 that are disposed on opposing sides of midplane MP toward first side wall 108 and second side wall 112, respectively. In the arrangement shown in FIGS. 1-3, approximately straight tread elements 146 and 148 are disposed at a common included angle relative to midplane MP but in opposing directions from one another. As discussed above in detail, however, it will be appreciated that any other arrangement and/or configuration of tread elements could alternately be used.

Furthermore, a plurality of tread elements of a tread in accordance with the subject matter of the present disclosure, such as tread elements 140 of tread 104, for example, can be disposed in any one of an almost limitless variety of patterns that extend around the circumference of the pneumatic tire and it is to be understood that the specific pattern (excepting the pitch sequences discussed hereinafter) that is shown and described herein is merely exemplary. A tread pattern of a tread, such as tread 104, for example, will often include one or more circumferentially-extending rows of tread elements that form an endless or closed-loop pattern of tread elements around the exterior of the tire.

In the exemplary arrangement shown in FIGS. 1-3, tread elements 144, 146 and 148 are disposed in a plurality of circumferential rows that are disposed laterally (i.e., axially) across the width of pneumatic tire 100 between shoulders 136 and 138, which are identified in FIG. 3 as circumferential rows CR1, CR2 and CR3. Where two or more circumferential rows of tread elements are used, the circumferential rows can be laterally positioned relative to one another in any suitable manner. As one example, the two or more circumferential rows could be laterally-spaced apart from one another such that an endless annular groove extends circumferentially about the tread (i.e., a groove that extends in an approximately straight line around the circumference of the tire). As another example, the two or more circumferential rows could laterally overlap or otherwise laterally interengage one another such that an endless but non-annular groove is formed between two of the circumferential rows and extends circumferentially about the tread (i.e., a groove that extends in a curved, wavy or otherwise non-straight line around the circumference of the tire).

Regardless of the shape and/or pattern of the plurality of tread elements that form a tread of a tire in accordance with the subject matter of the present disclosure, at least a portion of the plurality of tread elements have one of two different pitches with at least that same portion of the plurality of tread elements disposed in a circumferential row extending in an endless or otherwise closed loop around the tire in accordance with a predetermined pitch sequence.

As used herein, the term "pitch" (which may also be referred to in the art as a "design cycle") is generally interpreted to mean a section of tread in a circumferential direction that is repeated in two or more places around the outer circumference of a tire. A pitch normally includes a tread element and an adjacent tread void area that separates the tread element from the next circumferential tread element of the tire tread, such as is indicated in FIG. 3 by reference points A1 and A2, for example. Additionally, or in the alternative, a pitch can include a portion of a first tread element, a corresponding remainder portion of a second tread element and a tread void area disposed therebetween, such as is indicated in FIG. 3 by reference points B1 and B2, for example.

As used herein, the term "pitch length" is generally interpreted to mean the circumferential length of a given pitch. In some cases, a tread may include tread elements spaced at two or more pitches having a corresponding number of two or more pitch lengths. The term "pitch ratio" is generally interpreted to mean a ratio of a longer pitch length to a shorter pitch length. And, the term "pitch sequence" is generally interpreted to mean a plurality of tread elements and adjacent tread void areas (e.g., slots) in two or more pitches that are disposed in a particular arrangement around the circumference (e.g., in a circumferential row) of a tire to thereby at least partially form a tread pattern.

The tread pattern of tread 104 of tire 100 preferably includes tread elements having one of only two different pitches, which are identified in FIG. 3 as a first pitch P1 and a second pitch P2. For purposes of clarity of discussion, first pitch P1 is identified as having a first or shorter pitch length and second pitch P2 is identified as having a second or longer pitch length. It will be appreciated that the different pitch lengths of the first and second pitches can be achieved in any suitable manner. In the example shown in FIG. 3, tread elements 144A and 144B have two different sizes or circumferential lengths TL1 and TL2, respectively. In such case, the adjacent tread void areas (e.g., slots) can be approximately uniform in width. As another example, the tread elements of the tread pattern could be of substantially the same size or circumferential length with the adjacent tread void areas (e.g., slots) being of different width dimensions to vary the pitch length of the two different pitches. As a further example, a combination of tread element lengths and tread void area widths (e.g., slot widths) could be used to vary the pitch length of the two different pitches.

It may be desirable to maintain traction properties and/or other characteristics of a tire within the desired range of performance, or for other reasons, to utilize first and second pitch lengths for the first and second pitches that will result in a pitch ratio having a value within a range of approximately 1.15 to approximately 1.40. In some cases, a pitch ratio value within a range of approximately 1.20 to approximately 1.24 can be used. As one specific example, a value of approximately 1.22 for the ratio of second pitch length to first pitch length (i.e., P2/P1) could be used.

For agricultural and/or other off-road tires to which the subject matter of the present disclosure is particularly directed, a tread pattern having a quantity of 21 pitches can be used. Additionally, such a tread pattern of 21 pitches is preferably formed from a combination of tread elements having one of two different pitches and arranged in a predetermined pitch sequence. Such a pitch sequence acts to reduce noise and/or vibrations generated by movement of the tread through the air around the tire and/or by contact of the tread elements with a road surface by spreading the energy generated thereby over a broad range of frequencies. As one example, such a tread pattern can include at least one circumferential row formed from a plurality of tread elements that each has one of only two different pitches. Furthermore, the two different pitches that form the tread pattern of 21 pitches preferably have pitch lengths that result in a pitch ratio within a range of approximately 1.15 to approximately 1.40.

One example of a pitch sequence has been developed for a tread pattern that includes a quantity of 21 pitches with 12 pitches having a first or shorter pitch length (e.g., pitch length P1) and 9 pitches having a second or longer pitch length (e.g., pitch length P2). The present example of a pitch sequence for a tread pattern having 21 pitches is as follows with the first pitch being represented by ones (1) and the second pitch being represented by twos (2):
1112112111222111112222.

The foregoing example of a pitch sequence represents an endless or closed loop of pitches and it will be appreciated that any pitch element in the sequence can begin or end the sequence so long as the order of the pitch sequence is substantially maintained. Additionally, such a pitch sequence can act to reduce noise and/or vibrations during rotation of the tire in either direction (i.e., clockwise or counterclockwise) around the axis thereof. Thus, it will be appreciated that a pitch sequence in accordance with the subject matter of the present disclosure, such as the 21 pitch sequence listed above, for example, can also be used in reverse with any pitch element in the sequence beginning or ending the sequence, so long as the order of the pitch sequence is substantially maintained.

FIG. 3 illustrates a portion of the tread pattern of tread 104 with a plurality of pitches identified by dashed reference lines extending axially across the tread. The pitches identified by the dashed reference lines represent a portion of the above-listed 21 pitch sequence, namely, the first four pitches thereof, as is indicated in FIG. 3 by dimensions P1, P1, P2, P2. In a preferred arrangement, each pitch of the pitch sequence will extend axially across the tread, such as is shown in FIG. 3, for example. It will be appreciated, however, that any other arrangement and/or configuration could alternately be used.

Figure 4:
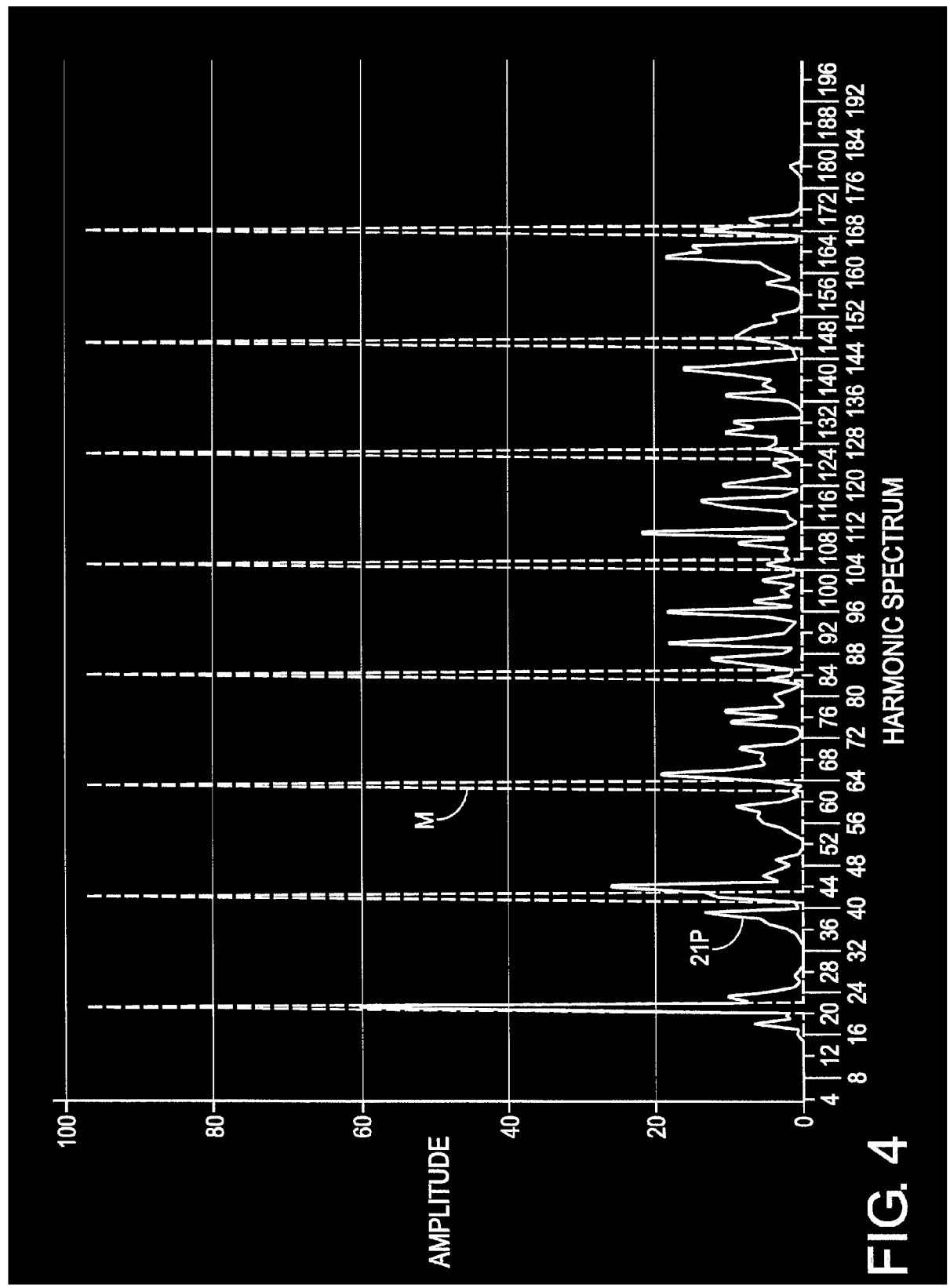
FIG. 4 is a graphical representation of a harmonic spectrum resulting from a computer-based simulation analyzing a specific example of a tire in accordance with the subject matter of the present disclosure and shown in comparison to a conventional mono-pitch tire.

FIG. 4 includes a graphical representation of a harmonic spectrum that resulted from a computer-based simulation in which a 21 tread pattern that includes tread elements arranged according to the above-listed pitch sequence was analyzed. The resulting harmonic spectrum is represented by the solid line in FIG. 4, which is identified by reference characters 21P. A harmonic spectrum corresponding to a mono-pitched tread pattern of a conventional tire is represented in FIG. 4 by the dashed line that is identified by reference character M. It will be recognized from FIG. 4 that utilizing a pitch sequence, such at the 21 pitch sequence of the above-described example, can advantageously result in the noise energy generated by the tire pattern being spread over a broad range of frequencies rather than being concentrated at certain harmonic frequencies, such as occurs with untreated, mono-pitched tires.

As discussed above, the foregoing example of a pitch sequence represents an endless or closed loop of pitches and it will be appreciated that any pitch element in the sequence can begin or end the sequence and that the sequence can be used in a forward or reverse direction, so long as the order of the pitch sequence is substantially maintained.

As used herein with reference to certain elements, components and/or structures (e.g., "first circumferential row" and "second circumferential row"), numerical ordinals merely denote different singles of a plurality and do not imply any order or sequence unless specifically defined by the claim language.

While the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject matter of the present disclosure. Obviously, modifications and alterations will occur to others upon reading and understanding the preceding detailed description. Accordingly, it is to be distinctly understood that the foregoing descriptive matter is to be interpreted merely as illustrative and not as a limitation. As such, it is intended that the subject matter of the present disclosure be construed as including all such modifications and alterations insofar as they come within the scope of the appended claims and any equivalents thereof.

The invention claimed is:

1. A tire having an axis of rotation, said tire comprising:
a tread extending circumferentially about said axis and including a plurality of tread elements disposed in a tread pattern, said plurality of tread elements arranged in one of two different pitch lengths with said two different pitch lengths having a pitch ratio within a range of from approximately 1.15 to approximately 1.40, said tread pattern including at least one circumferentially-extending row of tread elements consisting of 21 pitches having 12 occurrences of a first pitch length and 9 occurrences of a second pitch length.

2. A tire according to claim 1, wherein said at least one circumferentially-extending row of tread elements is arranged according to a pitch sequence of 111211211122211112222.

3. A tire according to claim 1, wherein said pitch ratio is within a range of from approximately 1.20 to approximately 1.24.

4. A tire according to claim 1, wherein said tread pattern is an agricultural tread pattern approximating one of an R1 configuration, an R1W configuration, an R2 configuration, an R3 configuration and an R4 configuration.

5. A tire according to claim 1, wherein said plurality of tread elements include a plurality of first tread elements and a plurality of second tread elements with said plurality of first tread elements being approximately identical and said plurality of second tread elements being approximately identical.

6. A tire according to claim 1, wherein said plurality of tread elements includes a first plurality of tread elements extending circumferentially about said axis in a first circumferential row and a second plurality of tread elements extending circumferentially about said axis in a second circumferential row adjacent said first circumferential row.

7. A tire according to claim 6, wherein said first and second pluralities of tread elements include a first pitch of said pitch sequence and said first pitch of said first plurality of tread elements is circumferentially aligned with said first pitch of said second plurality of tread elements.

8. A tire according to claim 7, wherein said first pitch of said first plurality of tread elements includes substantially all of a first tread element and substantially all of a first tread void area disposed circumferentially adjacent said first tread element.

9. A tire according to claim 7, wherein said first pitch of said first plurality of tread elements includes a portion of a first tread element, a corresponding remainder portion of a second tread element disposed circumferentially adjacent said first tread element and substantially all of a tread void area disposed between said first and second tread elements.

10. A tire according to claim 1, wherein said plurality of tread elements have one of only two different pitch lengths.

11. A tire according to claim 1 further comprising a tire carcass extending circumferentially about said axis and at least partially defining a pneumatic chamber, said tire carcass including:
a pair of axially-spaced bead cores; and,
a tire body operatively connected between said pair of bead cores, said tire body including a crown and a pair of axially-spaced side walls connecting said crown with said bead cores.

12. A tire according to claim 11, wherein said tread extends circumferentially about said tire carcass along at least a portion of said crown.

13. A tire according to claim 11, wherein said tire body includes one of a bias ply and a radial ply.

14. A tire having an axis of rotation, said tire comprising:
a tread extending circumferentially about said axis and including 21 tread elements disposed in a circumferentially-extending row, said 21 tread elements being disposed in circumferentially-spaced relation to one another and forming 21 pitches disposed circumferentially about said axis, said 21 pitches having one of two different pitch lengths, said 21 tread elements being arranged such that said 21 pitches have 12 occurrences of said first pitch length (1) and 9 occurrences of said second pitch length (2) arranged according to a pitch sequence of 111211211122211112222.

15. A tire according to claim 14, wherein said two different pitch lengths have a pitch ratio within a range of approximately 1.15 to approximately 1.40.

16. A tire according to claim 14, wherein said plurality of tread elements includes a first plurality of tread elements extending circumferentially about said axis in a first circumferential row and a second plurality of tread elements extending circumferentially about said axis in a second circumferential row adjacent said first circumferential row.

17. A tire according to claim 16, wherein said first and second pluralities of tread elements include a first pitch of said pitch sequence and said first pitch of said first plurality of tread elements is circumferentially aligned with said first pitch of said second plurality of tread elements.

18. A tire according to claim 17, wherein said first pitch of said first plurality of tread elements includes substantially all of a first tread element and substantially all of a first tread void area disposed circumferentially adjacent said first tread element.

19. A tire according to claim 17, wherein said first pitch of said first plurality of tread elements includes a portion of a first tread element, a corresponding remainder portion of a second tread element disposed circumferentially adjacent said first tread element and substantially all of a tread void area disposed between said first and second tread elements.

20. A method of manufacturing a tire, said method comprising:
forming a tire carcass extending circumferentially about an axis of rotation; and,
forming a tread extending circumferentially about said axis along said tire carcass, said tread including 21 tread elements disposed in a circumferentially-extending row, said 21 tread elements being disposed in circumferentially-spaced relation to one another and forming 21 pitches disposed circumferentially about said axis, said 21 pitches having one of two different pitch lengths, said 21 tread elements being arranged such that said 21 pitches have 12 occurrences of said first pitch length (1) and 9 occurrences of said second pitch length (2) arranged according to a pitch sequence of 111211211122211112222.

* * * * *